July 17, 1956 — H. T. KRAFT — 2,754,905
TIRE SIPING APPARATUS AND METHOD
Filed Aug. 17, 1951 — 5 Sheets-Sheet 1

INVENTOR
Herman T. Kraft
BY Evans & McCoy
ATTORNEYS

July 17, 1956 — H. T. KRAFT — 2,754,905
TIRE SIPING APPARATUS AND METHOD
Filed Aug. 17, 1951 — 5 Sheets-Sheet 3

INVENTOR
Herman T. Kraft
BY Evans + McCoy
ATTORNEYS

July 17, 1956　　　H. T. KRAFT　　　2,754,905
TIRE SIPING APPARATUS AND METHOD
Filed Aug. 17, 1951　　　　　　　5 Sheets-Sheet 4
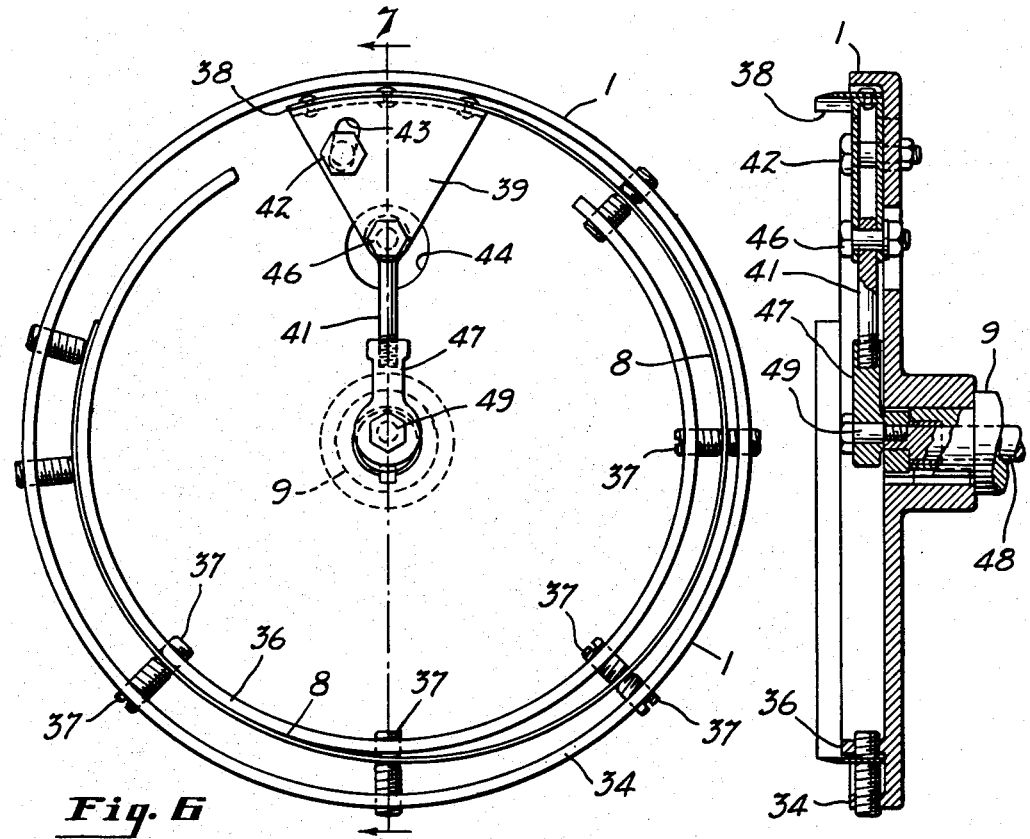
Fig. 6
Fig. 7
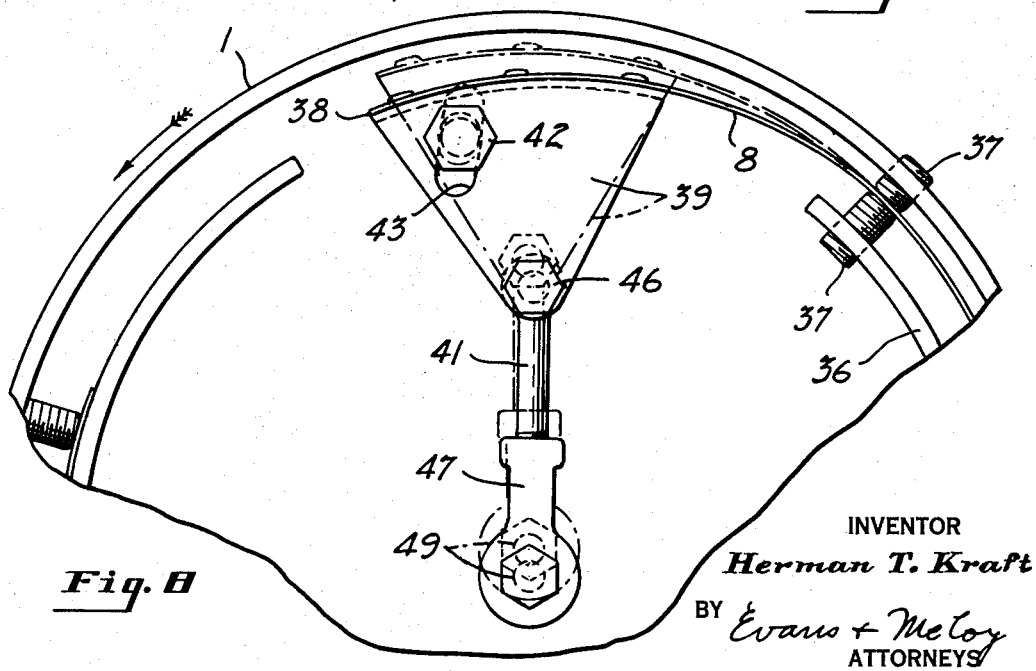
Fig. 8
INVENTOR
*Herman T. Kraft*
BY *Evans + McCoy*
ATTORNEYS

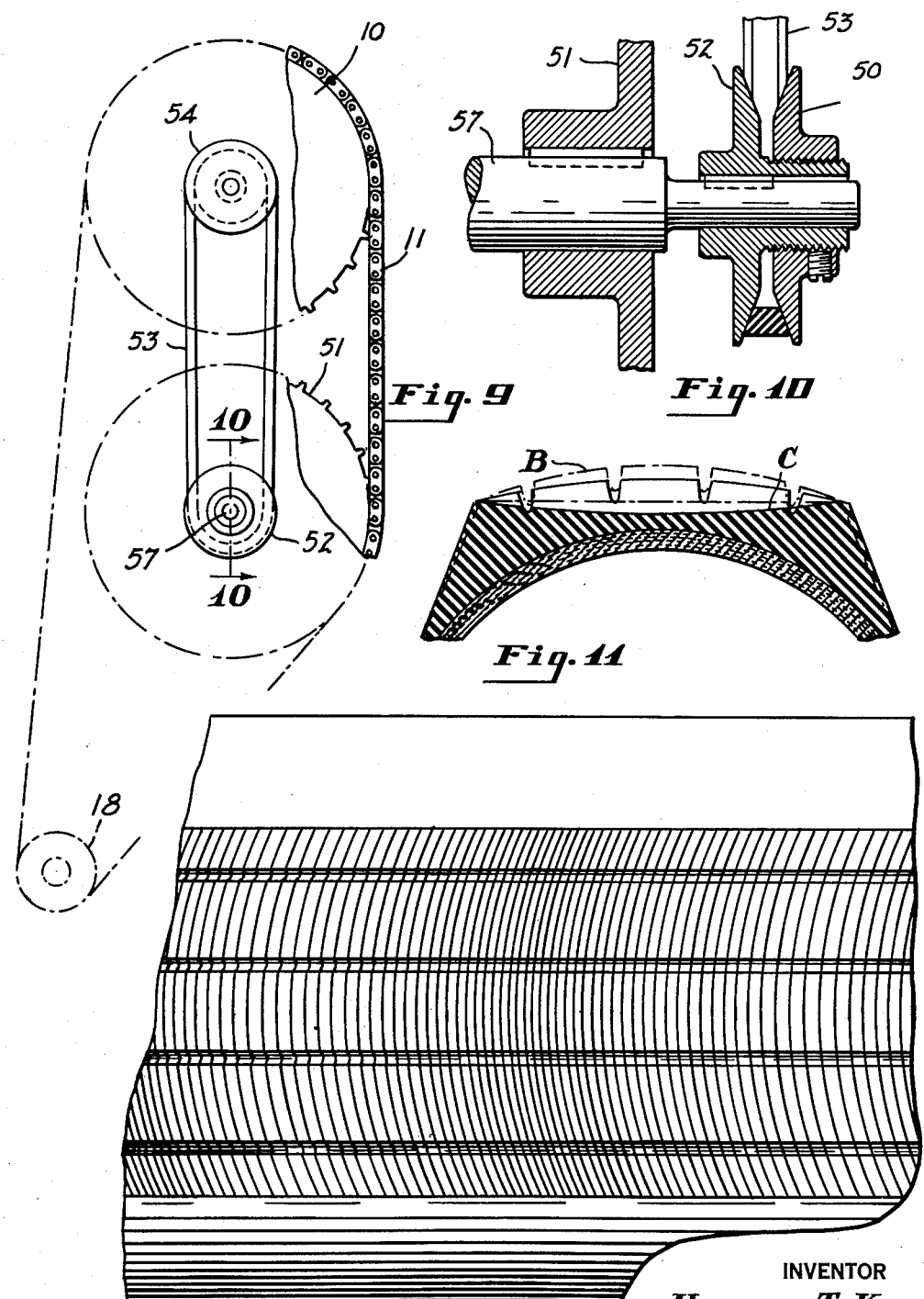

United States Patent Office 2,754,905
Patented July 17, 1956

2,754,905

TIRE SIPING APPARATUS AND METHOD

Herman T. Kraft, Akron, Ohio, assignor to The General Tire & Rubber Company, Akron, Ohio, a corporation of Ohio Application August 17, 1951, Serial No. 242,203

12 Claims. (Cl. 164—10.2)

The present invention relates to a method of and an apparatus for forming fine slits in the tread portions of pneumatic tires.

For some time, it has been known that a multiplicity of fine slits in a tire tread greatly increases the road gripping and skid resisting characteristics of the tire. This is known in the tire industry as siping. Siping has not been generally employed in the tire industry because there were no inexpensive, easily operated machines available and because the operation took too much time. In other words, the cost of the machinery and time of the operation made commercial siping prohibitive.

One object of the present invention is to provide a simple economical machine for slitting or siping tires.

Another object is to provide a method and machine for siping tires which rapidly and easily sipes the tires.

Another object is to provide a method of siping tires in which a series of variably spaced sipes are formed.

Still another object is to provide a machine which is economically manufactured and operated.

Other objects and advantages will appear in the following detailed description of the subject invention and the accompanying drawings, in which:

Fig. 6 is an elevation of the cutter head with the knife blade mounted therein, this view being enlarged with respect to the preceding figures;

Fig. 7 is a sectional view of the cutter head taken substantially on line 7—7 of Fig. 6;

Fig. 8 is a detail of the switch piece mounted on the leading edge of the cutter head blade;

Fig. 9 is a diagrammatic view showing the differential drive wheel arrangement for the cutter head shaft and the cam shaft, this view being taken substantially along line 9—9 of Fig. 2 and enlarged with respect thereto;

Fig. 10 is an enlarged cross-sectional detail taken substantially along line 10—10 of Fig. 9 showing the V-belt drive of the cam shaft;

Fig. 11 is a cross-sectional view through the tread and shoulder portions of an automobile tire showing a transverse slit or sipe formed in the tread by the method and apparatus of the present invention; and Fig. 12 is a plan view of siping cuts on a tire as made by this machine and method.

Figure 1:
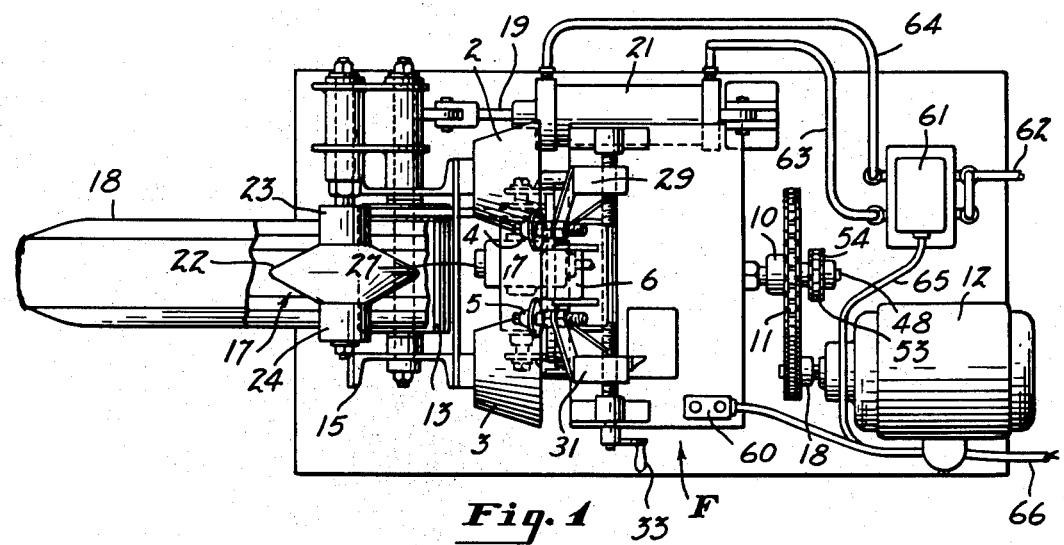
Figure 1 is a plan view of a siping machine embodying my invention with a tire mounted thereon.
Figure 2:
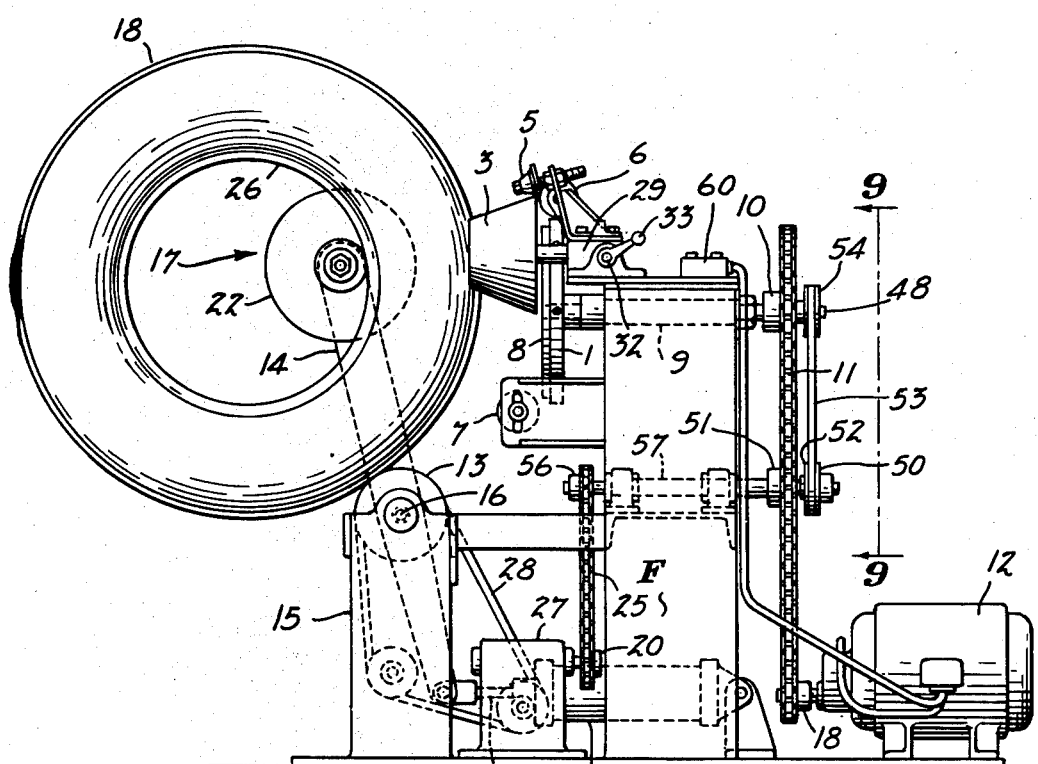
Figure 2 is a side elevation of the siping machine with a tire mounted thereon.
Figure 3:
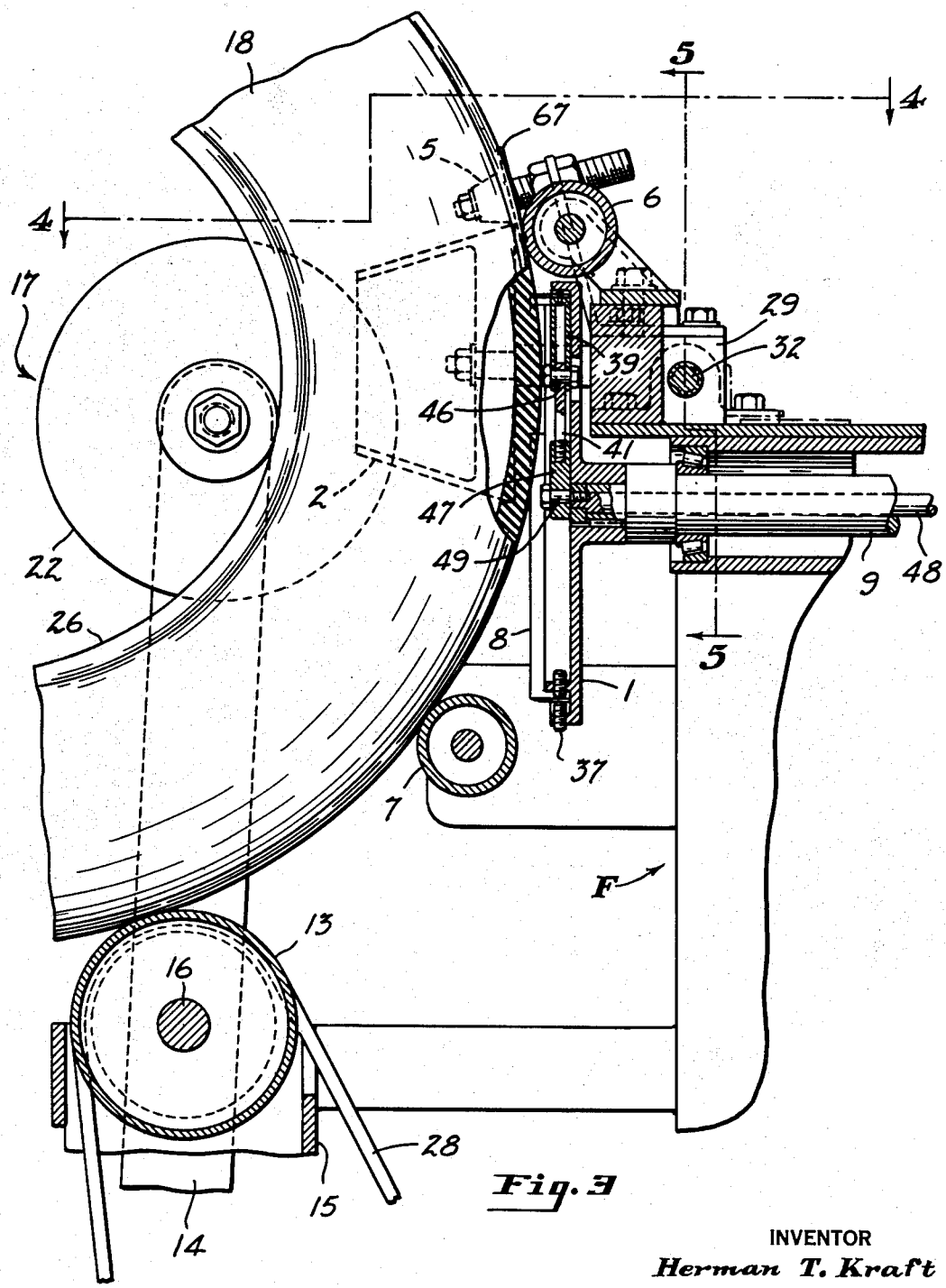
Fig. 3 is a fragmentary elevational detail of the cutter head area of the machine partly in section and with parts broken away and removed, this view being enlarged with respect to the preceding figures.

Referring to Figs. 1 and 2, it is seen that the machine of the present invention comprises a frame F on which is mounted a cutter head 1, tire shoulder rollers 2 and 3, centering rollers 4 and 5, roller means 6 above said cutter head and roller means 7 below said cutter head. A long, narrow knife blade 8 for cutting the tire is mounted around the circumference of the cutter head. The cutter head is keyed to shaft 9 which is in turn keyed to sprocket 10 on the other side of the frame from the cutter head. Sprocket 10 is driven by chain 11 from motor 12.

Spaced out from the frame F is a vertical support 15. The support 15 is generally U-shaped with a base tire roller means 13 mounted on the top and a relatively long arm 14 pivoted on pivot 16 on the tire roller means axis. It is aligned with the center of the cutter head and is spaced out about a foot from the cutter head. The arm 14 is pivoted near its middle portion and attached to its upper end is a pressure wheel 17. A tire 18 is thus rested on the pressure wheel 17 and supported on base roller means 13 on support 15. The pressure wheel 17 on arm 14 moves toward the cutter head to hold and press the tire against the cutter head.

A rod 19 is pivoted on arm 14 below the central pivot 16. A piston in cylinder 21 moves rod 19 toward the support the press the bottom portion of arm 14 toward the support and the top portion with the pressure wheel toward the cutter head.

The pressure wheel or supporting roller means 17 preferably has a central disc-like portion 22 of relatively large diameter and cylindrical shoulder portions 23 and 24 of relatively small diameter on either side of the central portion. The beads 26 of the tire rest on the cylindrical shoulder portions. Pressure wheels of other shapes can also be used. For instance, a wheel of two facing conical parts forming a deep central V groove or a simple cylindrical roller can be used.

The tire rests and is supported by base tire roller means 13. This is preferably power driven from speed reducer 27 by belt 28 to help feed the tire past the cutter head. When the roller means 13 is power driven, it is preferably driven faster than the lead drive on the cutter head so that the cutter head acts as an escapement and slippage occurs between the knurled surface of the roller and the tire.

Figure 4:
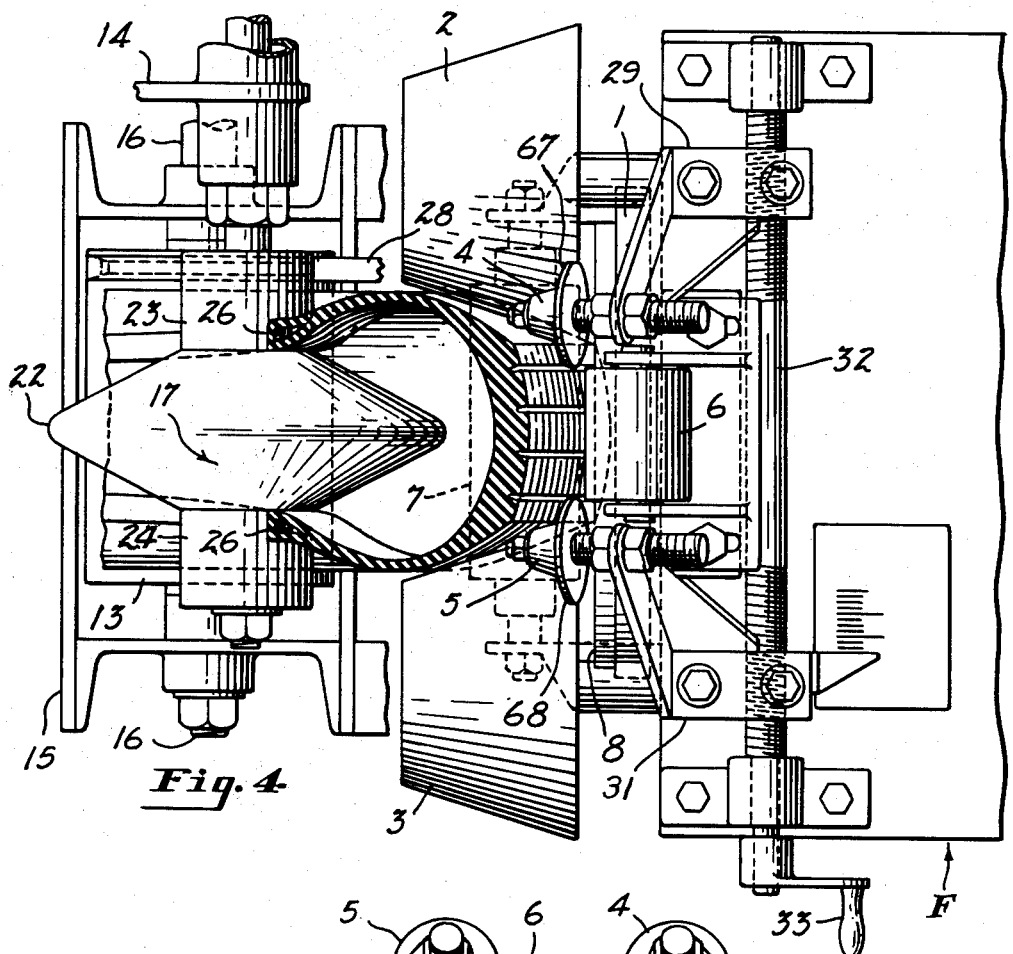
Fig. 4 is a cross-sectional plan view taken substantially along line 4—4 of Fig. 3.
Figure 5:
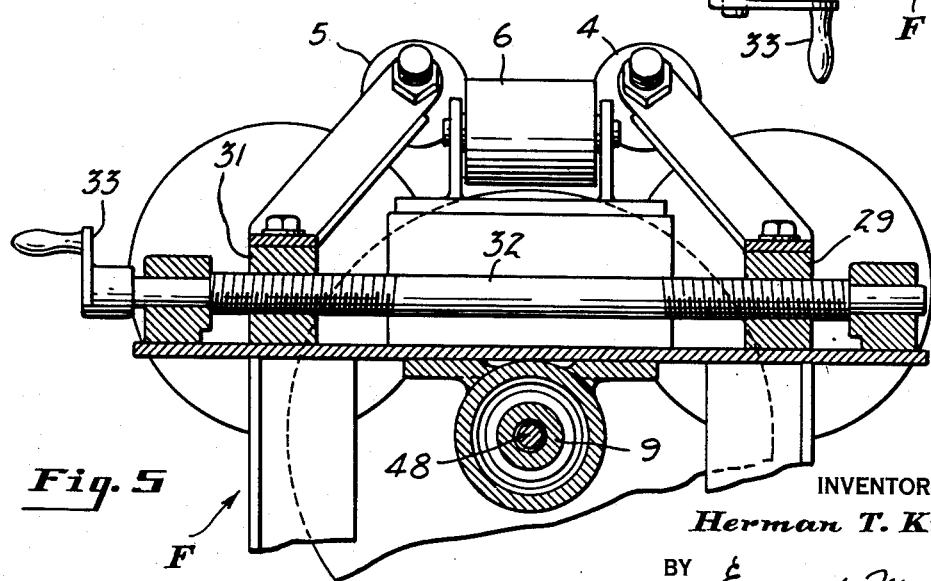
Fig. 5 is an elevational view taken substantially along line 5—5 of Fig. 3 showing the tire-shoulder rollers and the adjustment means therefor.

As shown in Figs. 4 and 5, the tire shoulder contacting means or rollers 2 and 3 are mounted for rotation about axes approximately perpendicular to the rotational plane of the cutter head to center and align the tire with respect to the cutter head. Conically shaped rollers with the smallest diameter facing the tire are used. The shoulder rollers contact the tire slightly below the cutting area or zone of the knife blade so as not to interfere with it. One roller opposes the sidewise thrust from the knife blade on the tire developed in the cutting operation. The pressure of the rollers against the tire shoulders can be varied to vary the bulge of the tread and in turn vary the depth and contour of sipe.

Mounted slightly above the cutting area of the knife blade are flanged centering rollers 4 and 5. These rollers are smaller, conically shaped rollers which also engage the tire shoulders and keep the tire aligned. Both the centering rollers and the shoulder rollers are attached to movable blocks 29 and 31. These blocks are in turn oppositely threaded with right-handed and left-handed threads and are received on the oppositely threaded ends of a rotatable rod 32 so that when crank 33 on one end of the rod 32 is turned, the blocks move toward or away from one another. In this way the rollers are adjustable for tires of different widths.

Roller means 6 directly above the cutter head and roller means 7 below the cutter head locate the tire with respect to the rotary cutter and keep the tire from scraping the frame F. The upper roller means 6 is adjustable in a direction transverse to the rotational plane of the cutter head to allow any desired degree of pressure against the cutter head and to permit cutting or siping of the tread to any desired depth.

Details of the cutter head are disclosed in Figs. 6 to 8. The cutter is a circular plate with an outside, axially directed flange or circumferential rim 34 and an auxiliary axially extending flange or rim 36 concentric thereto and spaced radially inwardly from the outside flange. The cutter is preferably about one foot in diameter. A head of such diameter gives sipes which are not objectionably curved or crowded together at the tire shoulders. Head diameters less than six inches give sipes which are too arcuate and crowded. An arcuate knife blade 8 is mounted between the rims or flanges by pairs of aligned, radially disposed screws 37. The screws are threaded through the circumferential and auxiliary flanges and clampingly engage the cutter blade between their confronting ends. Thus the blade can be accurately positioned. The leading edge of the knife blade is set out radially from the trailing edge to give it a lead. In other words, the blade as viewed in front elevation forms a spiral.

The leading edge 38 of the knife blade is attached to a V-shaped lug or switch plate 39 which is pivotally attached to one end of a connector rod 41. The switch plate is also guided by bolt 42 on the cutter head, said bolt moving in slot 43 in the cutter head. There is also a hole 44 in the cutter head providing an area of free movement for pivot bolt 46 which bolts the connector rod 41 to the switch plate. The other end of the connector rod screws into a yoke or ring 47 received on eccentric pin 49 on the end of shaft 48. As the eccentric shaft 48 rotates, the switch plate is moved radially back and forth by the connector rod. The leading edge of the knife blade thus moves in and out radially. This movement or shifting of the knife gives a varied pitch to the sipes or cuts in the tire so that they are not equidistant from each other but are irregularly spaced to avoid objectionable humming and singing of the tire in use.

Figs. 9 and 10 illustrate suitable means for driving the eccentric shaft at a slightly different rate from the cutter head shaft to accomplish the in and out motion of the switch plate. As previously mentioned, a chain 11 drives sprocket 10 which drives the cutter head shaft 9. This shaft is hollow and journaled inside of and concentric with it is eccentric shaft 48. Chain 11 also drives a sprocket 51 mounted below sprocket 10 at the same rotational speed, or substantially so. Directly keyed to sprocket 51 is an adjustable pulley wheel 52, shown in Fig. 10. It is adjusted by screwing faced disc 50 in and out on the pulley hub. This wheel drives V belt 53 which in turn drives pulley wheel 54 keyed to eccentric shaft 48. Adjustment of the pulley 52 varies its effective diameter to thereby drive the pulley wheel 54 and the eccentric shaft 48 at a slightly faster or slower rate of speed than the pulley 52 and the sprocket 51. Sprockets 10 and 51 turn at about 350 R. P. M. and the pulley 52 should be adjusted so that the speed of the eccentric shaft is about 5 R. P. M. faster or slower. Thus the eccentric shaft rotates slightly faster or slower than the cutter head shaft and cutter head so as to move the switch plate, through the eccentric, in and out. This gives a varied series of cuts or sipes on the tire face.

This cutter head arrangement can easily be adjusted to provide for a uniform lead for the knife blade as opposed to the variable lead described above. This can be accomplished by disconnecting rod 41 from yoke 47 and unbolting it from switch plate 39. The switch plate is then bolted by tightening bolt 42 onto the cutter head. This provides a uniform lead to the knife blade which can be adjusted to provide the desired spacing of the slits by loosening bolt 42 and moving the plate in or out. A uniform lead does not necessarily give uniformly spaced sipes because of differences in the frictional drive rate of the tire and differences in drag on the cutter resulting from variations in the percentage of tread width taken up by grooves and rib rubber on other tread design.

It is contemplated that the cutter head arrangement above described can be utilized in conjunction with other siping machines; for instance, for service station siping the tire can be kept on the automobile wheel and rested on roller means with driving means to drive it past the cutter head. The automobile itself can be driven up on rollers, taken out of gear, and then the wheel of the tire to be siped can be driven past a rotating cutter head of my design with a knife blade mounted therein.

Fig. 11 shows a tire cross-section. The depth of cut is revealed by arc C. When the tire is being cut, the tread is deformed by the pressure of the rolls 2 and 3 against the tire shoulders so that the center portion of the tread bows or bulges outward substantially to the position shown by the dotted line B. The rotating knife on each revolution cuts across the tread in an arcuate path and to a predetermined depth straight through the tire as thus held. This operation leaves a cut which is bowed inward or of variable depth across the tire tread width when the tire is released from the device and returns to a neutral shape or position.

Fig. 12 shows the way the cuts appear on the face of the tire. The cuts are irregularly or variably spaced about the circumference of the tread. This arrangement avoids objectionable humming and other noises such as are set up by evenly spaced sipes. The spacing between sipes may be from about one sixteenth inch to about one inch, preferably averaging around 3/32 of an inch.

Operation of this machine is as follows: A tire is set on the withdrawn pressure wheel and on the base roller. The pressure wheel is then brought forward to press the tire against the locating rollers and the cutter head. Finally, the cutter head and the base roller are turned on simultaneously so that the roller feeds the tire past the cutter head. The tire is rotated once around and the operation completed. The base roller is set to drive the tire slightly faster than the feeding rate of the cutter head blade so that the cutter head acts as an escapement or check on the tire and a substantially uniform feeding rate is achieved. Throughout the operation, soapy water is dripped onto the tire tread surface and the cutter head to lubricate the knife in the tire.

From this description it is apparent that I have provided a novel method and machine for siping tires. While I have described a preferred embodiment, it is to be understood that modifications may be employed within the scope of my invention.

What I claim and desire to secure by Letters Patent of the United States is:

1. An apparatus for siping tires comprising a frame, a shaft journalled on said frame, a substantially round cutter head on said shaft with its diameters perpendicular to the axis of said shaft, a knife mounted on said cutter head adjacent the circumference of said cutter head at its leading edge and radially inward therefrom at its trailing edge and projecting out from said head, a switch piece on the leading edge of said knife blade, a cam arrangement for moving said switch piece in and out from said cutter head shaft as said shaft rotates, means for rotating said shaft, means for actuating said cam arrangement, means for supporting tires so that a portion of the tread is held against the cutter head for siping, and means for rotating tires while so supported.

2. The tire siping machine of claim 1 with said cam arrangement for moving the leading edge of the cutting blade radially in and out from the cutter head shaft comprising a switch plate mounted on the leading edge of the blade, a connector rod pivotally connected to said switch plate, a cam shaft concentric with and inside of the cutter head shaft, an eccentric pin on the end of said cam shaft with the other end of said connector rod pivotally mounted on said eccentric pin, and means for driving said cam shaft at a slightly different speed from the speed of the cutter head shaft.

3. The tire siping machine of claim 1 with means for driving the cam shaft at a slightly different speed from that of the cutter head shaft comprising a sprocket wheel directly keyed to the cutter head shaft, a small driven wheel with a common center and disassociated from said sprocket wheel directly keyed to the cam shaft, a lower sprocket wheel with a diameter of the same dimensions as the upper sprocket wheel but with a slightly different number of teeth, a small drive wheel on a common center with the lower sprocket wheel and keyed thereto, belt driving means between said small drive wheel and said small driven wheel, a sprocket drive wheel, means for driving said wheel, and an endless chain connecting said upper sprocket wheel, said lower sprocket wheel, and said sprocket drive wheel.

4. A method of siping tires comprising the steps of disposing the tire on roller means against the face of a circular cutter head with a spiral-shaped cutting blade extending substantially perpendicularly out therefrom and then simultaneously driving the tire to feed it past the cutting blade and rotating the cutting blade to sipe the tread of the tire, said cutting blade acting as an escapement to control the feeding rate of the tire.

5. A method of siping tires comprising the steps of pressing the tire tread against a spiral-shaped cutting blade, said cutting blade being held in a head the plane of which is substantially tangent to the portion of the tire tread being siped, supporting the tire shoulder adjacent the cutting blade against sidewise thrust, driving the tire to feed it past the cutting blade and simultaneously rotating the cutting blade to sipe the tread of the tire, and moving the leading edge of the cutting blade radially in and out during the cutting operation to provide variably spaced sipes in the tire tread.

6. An apparatus for siping tires comprising a frame, a rotary cutter head mounted on said frame, driving means for said cutter head, a knife blade mounted on said cutter head adjacent the circumference of said head at its leading edge and radially inward therefrom at its trailing edge and projecting out from said head, a tire shoulder support on one side of said cutter head opposing sidewise thrust from said cutter head on the tire being siped, a pressure roll for supporting the tire being siped and pressing a portion of the tread of said tire against the knife blade in the cutter head, means for engaging and disengaging said pressure roll from pressing a portion of the tread of said tire against the knife blade in the cutter head, and roller drive means for driving said tire past the cutter head.

7. An apparatus for siping tires comprising a frame, a shaft journaled on said frame, a rotary cutter head on said shaft with its major diameter perpendicular to the axis of said shaft and provided with a circumferential rim and an auxiliary rim spaced radially inward from said circumferential rim, a knife blade adjustably held by screws between said circumferential rim and auxiliary rim so as to form a spiral and provide a uniform lead per cutter head revolution, said knife blade projecting substantially perpendicularly out from said cutter head, means for driving said shaft, and means for supporting tires so that a portion of the tread is held against the knife blade for siping.

8. An apparatus for siping tires comprising a frame, a shaft journaled on said frame, a rotary cutter head on said shaft with its major diameter perpendicular to the axis of said shaft and provided with a circumferential rim and an auxiliary rim spaced radially inward from said circumferential rim, a knife blade adjustably held by screws between said circumferential rim and auxiliary rim so as to form a spiral and provide a uniform lead per cutter head revolution, said knife blade projecting substantially perpendicularly out from said cutter head, a switch piece on the leading edge of said knife blade, a cam arrangement for moving said switch piece in and out from said cutter head shaft as said shaft rotates, means for rotating said shaft, means for actuating said cam arrangement, means for supporting tires so that a portion of the tread is held against the cutter head for siping and means for rotating tires while so supported.

9. An apparatus for siping tires comprising a frame, a shaft journaled on said frame, a flat circular cutter head on said shaft with its diameter perpendicular to the axis of said shaft and provided with a circumferential rim and an auxiliary rim spaced radially inward from said circumferential rim, a knife blade adjustably held by screws between said circumferential rim and auxiliary rim so as to form a spiral and provide a uniform lead per cutter head revolution, said knife blade projecting substantially perpendicularly out from said cutter head, a switch piece on the leading edge of said knife blade, a cam arrangement for moving said switch piece in and out from said cutter head shaft as said shaft rotates, means for rotating said shaft, means for actuating said cam arrangement, tire shoulder rollers on said frame on both sides of said cutter head to prevent lateral displacement of the tire being siped, tire roller means on said frame adjacent said cutter head to prevent tire from scraping the frame, a vertical support aligned with the center of the cutter head and spaced in front of the cutter head, base tire roller means mounted on said support for supporting and driving the tire, positive driving means for said base tire roller means, an arm pivoted on said support, a pressure wheel with its axis in a plane parallel to the plane of said cutter head mounted on said arm above the pivot point on said arm on said support, and an arm actuating means on said arm below the pivot point of said support for actuating said arm and pressure wheel to force and hold tires against cutter head.

10. A method of siping tires comprising the steps of supporting a tire on roller means at the beads and disposing a portion of the tire tread against rotatively-driven tire-feeding, cutting blade means, continuously driving the tire from the tread to feed it past the cutting blade means at a rate of feed slightly faster than the rate of feed of the cutting blade means, and simultaneously driving the cutting blade means to sipe the tread of the tire, whereby the cutting blade means periodically is engaged with and disengaged from the tread of the tire so that the tire is fed during periods of engagement at the rate of feed of the cutting blade means and the cutting blade means acts as an escapement to control the rate of tire feed during periods of disengagement.

11. A method of siping tires comprising the steps of supporting the tire on roller means at the beads, disposing a portion of the tire tread against the face of a circular cutter head with a spiral-shaped cutting blade extending substantially perpendicularly out therefrom, continuously driving the tire from roller drive means engaging the tire tread to feed it past the cutter head, and simultaneously rotating the cutting head to sipe the tire.

12. A method of siping tires comprising the steps of supporting a tire on roller means at the beads and disposing a portion of the tire tread against rotatively-driven, spiral-shaped cutting blade means, continuously driving the tire from roller driving means engaging the tire tread to feed it past the cutting blade means at a rate of feed slightly faster than the rate of feed of the cutting blade means, and simultaneously driving the cutting blade means to sipe the tread of the tire, whereby the cutting blade means periodically is engaged with and disengaged from the tread of the tire so that the tire is fed during periods of engagement at the rate of feed of the cutting blade means and the cutting blade means acts as an escapement to control the rate of tire feed during periods of disengagement.

(References on following page)

References Cited in the file of this patent

UNITED STATES PATENTS

| | | | |
|---|---|---|---|
| Re. 14,765 | Urbach | Dec. 2, | 1919 |
| 1,256,841 | Stevens | Feb. 19, | 1918 |
| 1,263,286 | Putt | Apr. 16, | 1918 |
| 1,280,753 | Juengst | Oct. 8, | 1918 |
| 1,329,849 | Pierson | Feb. 3, | 1920 |
| 1,745,021 | Liebau | Jan. 28, | 1930 |
| 1,781,398 | Krause | Nov. 11, | 1930 |
| 1,876,775 | Smith | Sept. 13, | 1932 |
| 2,034,662 | McLaughlin | Mar. 17, | 1936 |
| 2,105,316 | Fleming | Jan. 11, | 1938 |
| 2,167,017 | Wikle | July 25, | 1939 |
| 2,180,556 | Sipe | Nov. 21, | 1939 |
| 2,183,376 | Wikle | Dec. 12, | 1939 |
| 2,200,730 | Smallwood et al. | May 14, | 1940 |
| 2,575,450 | Huff | Nov. 20, | 1951 |